ELECTRIC PULSE MODULATING AND DEMODULATING CIRCUITS

Filed Nov. 30, 1955 4 Sheets-Sheet 1

Inventor
K. W. CATTERMOLE
By Robert Harding Jr.
Attorney

Inventor
K. W. CATTERMOLE
By Robert Harding Jr.
Attorney

Inventor
K. W. CATTERMOLE
By Robert Harding Jr.
Attorney

Inventor
K. W. CATTERMOLE
By Robert Harding Jr.
Attorney

3,020,349
ELECTRIC PULSE MODULATING AND DEMODULATING CIRCUITS

Kenneth William Cattermole, London, England, assignor to International Standard Electric Corporation, New York, N.Y., a corporation of Delaware
Filed Nov. 30, 1955, Ser. No. 550,163
Claims priority, application Great Britain Dec. 3, 1954
8 Claims. (Cl. 179—15)

The present invention relates to electric pulse modulating and demodulating circuits.

In electric pulse communication systems it is common practice to take periodic samples of the amplitude of a signal wave and then to transmit a pulse or group of pulses representing each sample according to one of the well-known pulse transmission methods. In the simplest case, the samples may be directly transmitted as amplitude modulated pulses.

In the case of any of these methods as hitherto practised, the duration of the sample is usually a small fraction (commonly less than one tenth) of the sampling period, and the arrangement is extremely inefficient, since less than one tenth of the power available in the signal wave is actually used, at least nine-tenths being wasted. As a result, an amplifier has to be associated with each pulse modulator. For similar reasons an amplifier has also to be used with the corresponding demodulator and these amplifiers make the system unilateral. It follows from this that for two-way operation, all the modulating and demodulating equipment has to be duplicated at each terminal station. This makes a very expensive and cumbersome arrangement, particularly for a multichannel system, and it becomes prohibitive, both as regards expense and complication, when time division pulse principles are applied to electronic switching.

The principal object of the present invention is to simplify and cheapen the equipment necessary for amplitude modulation pulse communication systems.

This object is achieved by providing an electric pulse translating arrangement for connecting a first circuit to a second circuit, the operating time of which arrangement is divided into successive odd- and even-numbered periods, and in which a reactive storage device is charged with energy derived from the first circuit during odd-numbered time periods, and is discharged into the second circuit during even-numbered time periods.

The invention also provides a bilateral electric pulse translating arrangement comprising a local circuit for a signal wave, a pulse circuit for a train of periodically repeated pulses, a reactive device, means for periodically storing energy received from either one of the said circuits in the said reactive device, and means for periodically discharging the stored energy derived from each circuit into the other circuit.

The invention also provides a bilateral electric pulse translating arrangement in which energy derived from an incoming signal wave is periodically stored in a reactive device, which device is periodically discharged to produce a train of amplitude modulated pulses, and in which energy derived from each pulse of an incoming train of amplitude modulated pulses is stored in the said reactive device, which device is discharged after each pulse for reproducing the wave which has modulated the train of pulses.

The invention also provides a bilateral electric pulse translating arrangement for connecting a local circuit to a pulse circuit comprising means for periodically charging a reactive storage device with energy derived from either of the said circuits and discharging it into the other circuit, the charging time constant corresponding to one of the said circuits being different from the charging time constant corresponding to the other circuit.

The invention also provides a bilateral pulse translating arrangement comprising means for connecting a local circuit to the input terminals of a delay network storage device, means for connecting the said input terminals to a pulse circuit through a periodically operated switch device, each period of operation being divided into two unequal sub-periods, the arrangement being such that the said input terminals are connected to the pulse circuit during each shorter sub-period and are disconnected during each longer sub-period, the duration of the shorter sub-periods being substantially equal to twice the delay of the delay network.

The invention also provides a periodically operating bilateral electric pulse translating arrangement for connecting a local circuit to a pulse circuit, in which each operating period is divided into two unequal sub-periods, comprising means for storing energy derived from the said local circuit in a reactive device during the longer sub-periods, and for discharging the said device into the said pulse circuit during the shorter sub-periods, and means for storing energy derived from the said pulse circuit during the shorter sub-periods in the said device, and for discharging the said device into the said local circuit during the longer sub-periods.

The invention further provides electric pulse communication systems employing such bilateral electric pulse translating arrangements.

The bilateral translating arrangements according to the invention are combined modulating and demodulating circuits analogous to the passive bilateral modulating circuits (sometimes called "modem" circuits) commonly used in carrier current systems, which act also in the opposite direction as demodulating circuits without any modification. The advantage of employing energy storage in the bilateral pulse translating or modulating circuit according to the invention is that by suitable design of the circuit the total energy loss suffered by the signal wave by transmission through a pair of these pulse "modem" circuits (excluding loss in the transmission medium) can be reduced to a few decibels, so that amplifiers are not required in the channel apparatus, and therefore a single set of channel apparatus can be used at each terminal for both directions of transmission.

The invention will be described with reference to the accompanying drawings, in which.

Figure 1:
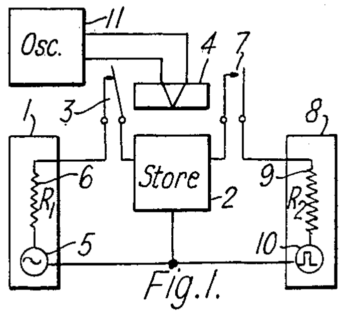
FIG. 1 shows in diagrammatic form a combined pulse amplitude modulator and demodulator according to the invention.

FIG. 1 shows in diagrammatic form one arrangement of a bilateral pulse amplitude, modulator or "pulse modem," according to the invention. A source 1 of a signal wave is connected to the input side of a reactive storage device 2 through a pair of normally closed contacts 3 of a relay 4. The source 1 will be assumed to be equivalent to a generator 5 of signal wave voltages acting through a resistor 6 of resistance $R_1$. The output side of the storage device 2 is connected through a pair of normally open contacts 7 of the relay 4 to a pulse circuit or load 8 represented by a resistor 9 of resistance $R_2$, connected in series with a generator 10.

The relay 4 is controlled by a pulse generator or oscillator 11 which supplies substantially rectangular switching pulses of current for periodically operating the relay 4 in such manner that in response to each switching pulse the contacts 3 are opened and the contacts 7 are simultaneously closed. It will be assumed that the switching pulses have a repetition period $t_1$, and that their duration is $t_2$ which will generally be much less than $t_1$; for example, less than $t_1/10$.

The device 2 may consist of a suitable assembly of reactive elements (capacitors, inductors, transformers) in which energy derived from the generator 5 may be stored. Neglecting, first of all, the generator 10, it will be seen that during the whole period $t_1-t_2$ between two successive operations of the relay 4, energy will be continuously fed into the device 2 from the generator 5, while during the short period $t_2$ the energy so stored will be discharged into the pulse circuit 8. Thus there will be supplied to the pulse circuit 8 a train of pulses of duration $t_2$ and repetition period $t_1$, and the amplitude of each pulse will be determined by the total energy derived from the generator 5 during the previous relatively long period $t_1-t_2$. On the assumption that the voltage variations of the source 5 take place at frequencies low compared with $1/t_1$, it will be apparent that the amplitude of each pulse supplied to the pulse circuit 8 will be substantially proportional to the average voltage of the signal source 5 during the preceding period $t_1-t_2$.

In order to obtain maximum efficiency, the arrangement should be such that substantially all the energy stored in the device 2 during the period $t_1-t_2$ is discharged into the pulse circuit 8 during the short period $t_2$. It can be shown that for maximum efficiency, the rate of storing energy in the device 2 from the source 5 should be less than the rate of discharge of the energy into the pulse circuit 8. This requires the choice of the resistances $R_1$ and $R_2$ so that the storage time-constant is greater than the discharging time-constant. The best relation between these two time-constants will be indicated below.

The arrangement of FIG. 1 is completely reversible. If the generator 5 be now disregarded, and the generator 10 supposed to supply a train of amplitude modulated pulses of repetition period $t_1$ and duration $t_2$, synchronised with the oscillator 11 in such manner that each pulse arrives when the contacts 7 are closed and the contacts 3 are open, it will be seen that substantially all the energy contained in each pulse will be stored in the device 2 during the short period $t_2$ and will be discharged into the source 1 during the longer period $t_1-t_2$ between pulses. The wave supplied to the source 1 will thus be in the form of nearly rectangular pulses of duration $t_1-t_2$, with varying amplitude, and the actual form of these pulses will depend on the nature of the device 2. The pulses can be smoothed out by means of a low pass filter (not shown in FIG. 1) to reproduce the wave with which the pulses supplied by the source 10 were modulated. This demodulating process is efficient because practically the whole of the energy contained in each pulse is used, and is spread over the following period $t_1-t_2$ which intervenes before the next pulse is received.

Figures 5, 6, 7:
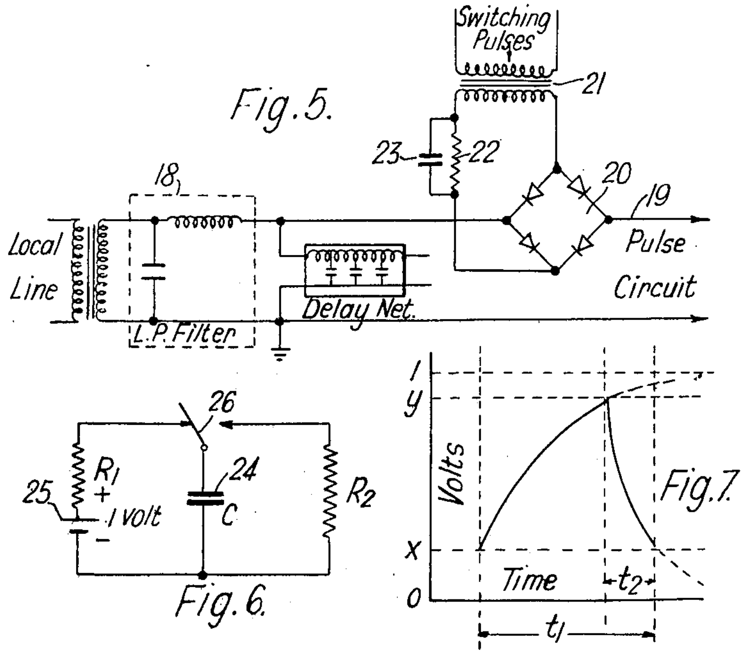
FIG. 5 shows circuit details of a pulse modulator and demodulator according to FIG. 4.
FIGS. 6 to 10 show diagrams used in the explanation of the operation of circuits according to the invention.

It has already been said that circuit of FIG. 1 is diagrammatic. In practice, of course, a mechanical relay such as 4 could not be used, except for very limited applications operating at very low frequencies. When the arrangement is required for transmitting speech waves, for example, the relay 4 will be replaced in practice by an equivalent electronic switching system employing rectifiers, for example. A practical arrangement of this sort is shown in FIG. 5.

FIG. 1 shows only one possible arrangement of the relay contacts (or equivalent switches). The arrangement to be used may depend partly on the arrangement of the circuit of the device 2; one alternative shown in FIG. 2 has the pairs of relay contacts 12 and 13 in shunt with the device 2 instead of in series, contacts 12 being normally open and contacts 13 normally closed.

Figure 2:
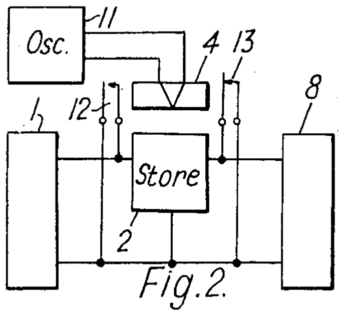
FIGS. 2, 3 and 4 show modifications of FIG. 1.

It should be mentioned that in many cases the contact pairs 3 and 12 shown in FIGS. 1 and 2 may be omitted, so that the source 1 is permanently connected to the device 2. The fact that the device 2 remains connected to the source 1 during the short period $t_2$ when it is also connected to the pulse circuit 8 makes negligible difference to the operation of the circuit, particularly if the ratio of $t_1$ to $t_2$ is large.

Figure 3:
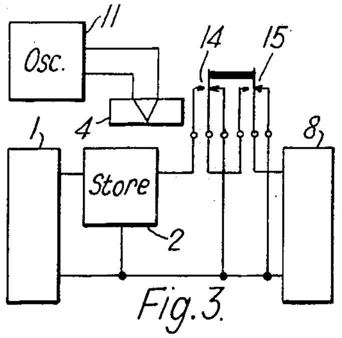

The efficiency of the circuit depends on the quality of the switches used. When the switches consist of rectifier arrangements, the operation is degraded to some extent because a rectifier switch does not have infinite resistance when it is open or zero resistance when it is closed. The effects of these imperfections may be reduced by using several switches arranged alternately in series and in shunt, as shown diagrammatically in FIG. 3, which shows effectively four such switches, though there can be any number. The switches are represented by two sets of changeover contacts 14, 15 controlled by the relay 4. This arrangement using rectifiers effectively forms a ladder type resistance attenuator which has a very high attenuation in the position shown, and a very low attenuation in the opposite position. The total number of switches can be odd or even, and this depends on whether the switch combination is desired to present substantially open or substantially short-circuit conditions to the device 2 or to the pulse circuit 7, when the connection is broken. In FIG. 3, a permanent connection between the source 1 and the device 2 is assumed.

Figure 4:
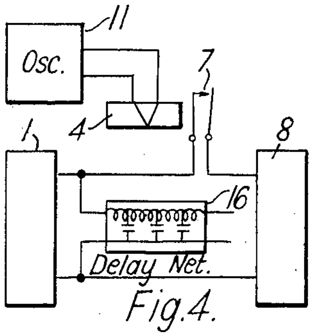

The reactive device 2 may, for example, consist of a single capacitor, a single inductor or a single transformer, or a combination of two or more of any of these elements. The preferred form, however, is shown in FIG. 4, and comprises a delay network 16 which has its input terminals connected to the source 1, and its output terminals open circuited. FIG. 4 is similar to FIG. 1, with the contact pair 3 omitted. The advantage of the delay network is that it can be completely discharged during the short period $t_2$. The delay should be chosen equal to $t_2/2$, so that the delay network becomes just fully discharged during the period $t_2$.

Another useful form which the reactive device 2 may take is a single capacitor (not shown) connected across the source 1, instead of the delay network, in FIG. 4. This is a simpler and cheaper form but is not quite so efficient. Another obvious but generally less useful alternative is a series connected inductor (or a short circuited delay network), in which case the switch requires to be a normally closed shunt switch like 13 in FIG. 2.

FIG. 5 shows details of the preferred practical form of a combined pulse modem according to the invention. A local line (not shown) carrying speech signals (for example) is connected through an audio frequency input transformer 17 and a half-section of a low pass filter 18 to the delay network storage device 16, the output terminals of which are open-circuited. One input terminal of the delay network 16 is preferably connected to ground as shown, and the other terminal is connected to a pulse transmission circuit or line 19 through one pair of diagonal corners of a rectifier bridge 20 comprising four rectifiers, which operates as the switch 7 of FIG. 4. A train of short regularly repeated switching pulses is supplied from a suitable source (not shown) through a transformer 21 to the other pair of diagonal corners of the rectifier bridge 20. A resistor 22 shunted by a capacitor 23 is included in series with one of the conductors connecting the transformer 21 to the bridge 20.

The switching pulses may have a duration of 2 microseconds, for example, and the repetition period may be 100 microseconds, corresponding to a sampling frequency of 10 kilocycles per second. The delay network 16 should then have a delay of 1 microsecond, and its characteristic impedance should be equal to $R_2$, which may be 500 ohms, for example.

After the circuit has been operating for a few seconds, the capacitor 23 will acquire a charge which will hold the bridge rectifiers normally blocked, but the rectifiers will be unblocked by the crest of each switching pulse; that is, a connection will be completed between the delay network 16 and the transmission circuit 19 for 2 microseconds every 100 microseconds, thereby discharging the delay network 16 into the circuit 19. The rectifier bridge 20 is thus equivalent to the pair of relay contacts 7 of FIG. 4.

Before proceeding to describe the complete two-way arrangements using a combined pulse modulator and demodulator at each end of the circuit, a brief theoretical discussion of the circuits of FIGS. 1 to 5 will be given.

In FIG. 6 a simplified schematic circuit of FIG. 1 is shown, in which the device 2 of FIG. 1 consists of a shunt capacitor 24 of capacity C, the source 5 of FIG. 1 being represented by a battery 25 assumed for simplicity to provide a potential of 1 volt. The switches 3 and 7 of FIG. 1 are represented by a change-over switch 26. During the period $t_1-t_2$ the capacitor 24 is charged through the resistor $R_1$, and during the period $t_2$ it is discharged through the resistor $R_2$. FIG. 7 shows graphically the potential variations of the capacitor 24 for one complete cycle of duration $t_1$. The potential of the capacitor varies between two values, $x$ volts, a little above zero (since it is never completely discharged), and $y$ volts a little less than 1 volt. The potential rises from $x$ to $y$ during the period $t_1-t_2$ with a time constant $T_1=CR_1$, and falls from $y$ to $x$ during the period $t_2$ with a time constant $T_2=CR_2$.

The following additional symbols will be used:

$$a=(t_1-t_2)/t_2 \qquad a/(1+a)=m$$
$$A=(t_1-t_2)/T_1$$
$$B=t_2/T_2 \qquad A+B=D$$

then it can be shown that the power efficiency P (that is the power delivered to the resistor $R_2$ divided by the power available from source 25) is given by $$P=[4m/AB](1-e^{-A})^2(1-e^{-B})^2(1-e^{-D})^2 \quad (1)$$

This formula also applies to the case in which storage is by self inductance or mutual inductance. It is symmetrical with respect to A and B and therefore applies to both directions of transmission.

In all practical cases $m$ will be nearly equal to 1. It can be shown that the maximum value of $P$ (namely $m$) will be obtained when A and B are both zero. This means $T_1$ and $T_2$ are both infinite, which is not a practical case.

However, if A and B are small, they should be approximately equal for maximum efficiency, but it will be found that in practice small values cannot be used. Another limiting case is that in which A (or B) is large, in which case the value of B (or A) for maximum efficiency tends a constant limit of about 1.25. The efficiency realisable in this case is several decibels below the theoretical maximum. For example if $A=4$ and $B=1.25$, the loss of efficiency will be about 4 decibels.

Figure 8:
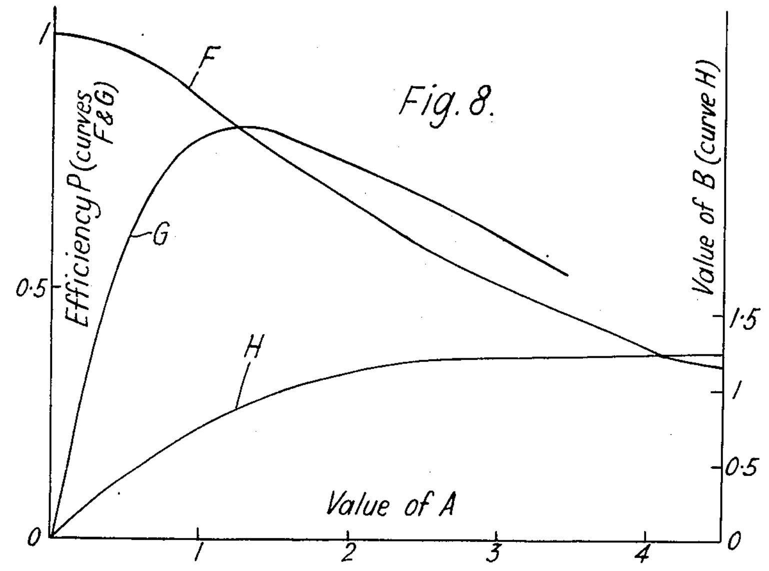

Curve H of FIG. 8 shows the value of B which will produce maximum efficiency plotted against the corresponding value of A, and curve F shows the corresponding power efficiency P obtained. The minimum practicable value of A is probably about 2, in which case a loss efficiency of about 1.8 decibels will be obtained.

Figure 9:
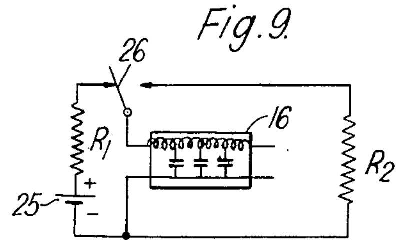
Figure 10:
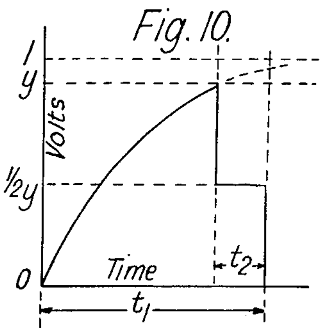

If a delay network is used instead of a capacitor or inductor as a storage device, as shown in the simplified circuit of FIG. 9, the cycle of operation is represented by the graph of FIG. 10. In this case, since the delay network is assumed to be open-circuited it will behave similarly to a capacitor during the charging period and, since it is completely discharged during the period $t_2$, the charging curve starts from zero, the potential rising to $y$ volts during the period $t_1-t_2$, as shown in FIG. 10. However, during the period $t_2$, the discharge curve is quite different from that of a capacitor. Assuming that the characteristic impedance of the delay network is equal to $R_2$, as soon as the switch 26 operates to discharge the delay network, the potential falls suddenly to $y/2$ because of the load applied by $R_2$, and then remains constant until the end of the period $t_2$ when it falls suddenly to zero. These effects are illustrated in FIG. 10.

It has already been stated that the delay of the delay network 16 should be $t_2/2$ in order that it may be completely discharged during the period $t_2$. Its characteristic impedance should be made equal to $R_2$. Then during the charging period it will appear like a capacitor of capacity $C=t_2/2R_2$. The charging time constant $T_1$ will then be equal to $CR_1$ as before, and putting $$A=(t_1-t_2)/T_1$$

it can be shown that the power efficiency P of the arrangement shown in FIG. 9 is given by $$P=[2m/A](1-e^{-A})^2 \quad (2)$$

This relation is shown by the curve G in FIG. 8, and it has a maximum value of 0.82 when $A=1.25$, and this maximum value occurs at the point where the curve G cuts the curve F, which applies to the case of single capacitor storage. It will be noted that the delay network is very inefficient for small values of A, but is more efficient than the capacitor when A exceeds 1.25. It is chiefly for the latter reason that a delay network is preferable to a single reactive element as a storage device, because practicable values of A are generally about 2 or greater. Another advantage of using a delay network is that the pulses delivered to the load $R_2$ are substantially rectangular, whereas in the case of storage by a single reactive element they always have an exponential crest.

It will be understood that a short-circuited delay network can be used if desired, in which case FIG. 10 represents the currents supplied instead of the voltages, and the formula just given for the efficiency P also applies. This formula also represents the efficiency for transmission in the opposite direction. That is, if a rectangular pulse of amplitude $y/2$ is supplied during the period $t_2$ when the switch 26 is operated to the right, the power efficiency P corresponding to the energy delivered to the resistor $R_1$, when the switch is operated to the left is as just given, if $T_1$ be taken as the discharge time-constant.

Figure 11:
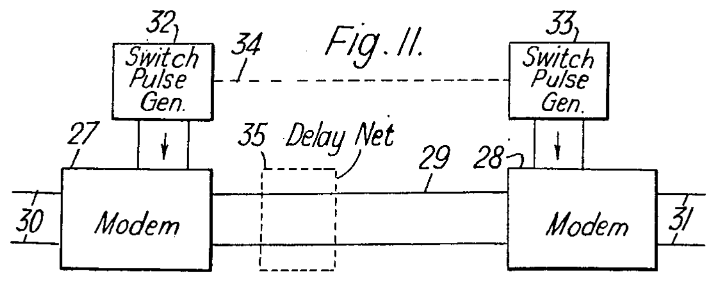
FIG. 11 shows a block schematic circuit diagram of a complete two-way pulse channel employing bilateral pulse modulators according to the invention.

FIG. 11 illustrates the simplest case of a complete single channel two-way pulse communication system in which two pulse modem circuits 27, 28, each of which may be as shown in FIG. 5, are directly connected by a pulse circuit 29, which may, for example, comprise just a pair of wires, or any other suitable means for transmitting pulses. Local two-wire lines (not shown) carrying speech or other message waves are connected to the local terminals 30, 31 of the modem circuits 27, 28, which are provided with similar switching pulse generators 32, 33 designed to generate rectangular switching pulses of duration $t_2$ with a repetition period $t_1$, and suitably synchronised by means indicated by the dotted line 34.

In order that the circuit shall operate correctly, it is necessary that at each end the period $t_2$ during which the rectifiers 20 (FIG. 5) are rendered conducting should coincide with the periods of the pulses of duration $t_2$ received from the opposite end. This requires that the transmission delay of the circuit 29 shall be equal to $nt_1/2$, where $n$ is zero or any integer. It also requires that the switching pulses generated by the sources 32 and 33 should be simultaneous (if $n$ is even) or staggered by $t_1/2$ (if $n$ is odd). The first requirement can evidently be met in several ways, such as by adjusting the length of the circuit 29 so that the proper delay is obtained, or if this is not practicable, a delay network indicated by the dotted outline 35 in FIG. 11 may be inserted at some convenient point in the line, the delay of the network being such as will make up the total delay to $nt_1/2$. In some cases the requirement can be met without the addition of a delay network by suitably choosing or adjusting the value of $t_1$.

In practice, the proper synchronising of the two pulse generators 32 and 33 does not necessarily involve the use of an additional path.

The curves F and G shown in FIG. 8 and the corresponding equations for the power efficiency P relate to the case in which the signal frequency is zero, and in which transmission is in one direction only. They are useful for indicating the relative efficiency of the storage arrangements concerned, but in the practical case, since it is necessary to transmit a band of frequencies, the frequency characteristic of the modem arrangement should be investigated. The results of this investigation will be stated.

A frequency variable $z$ will be used, where $z=2\pi f/F$, in which $f$ is a variable frequency in the band to be transmitted, and F is the sampling frequency $1/t_1$. A and B have the same meanings as before, and $m$ will be taken as equal to 1. $P(z)$ stands for the ratio of the power at frequency $f$ delivered by the modem (FIG. 1) to the pulse circuit 8, to the power supplied to the modem from the source 1.

Then when a delay network is used as the storage device, $$P(z)=2A(1-2e^{-A}\cos z+e^{-2A})/(A^2+z^2) \quad (3)$$

$$=4A(\cosh A-\cos z)/e^{A}(A^2+z^2) \quad (4)$$

By putting $z=0$ (corresponding to zero frequency) it will be seen that Equation 3 reduces Equation 2, if $m=1$.

When a single reactive element is used as the storage device, $$P(z)=4AB\ (\cosh A-\cos z)/(A^2+z^2)K \quad (5)$$

where $K=\cosh\ (A+B)-\cos z$.

Figure 12:
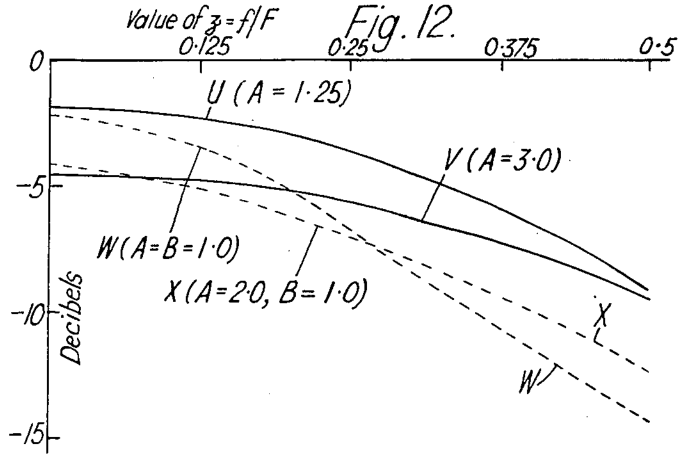
FIG. 12 shows frequency characteristics of two-way pulse circuits employing bilateral pulse modulators according to the invention.

The difference between Equations 4 and 5 chiefly lies in the fact that if A and B are chosen so that $P(z)$ as given by Equation 4 or 5 is substantially the same when $z=0$, the value of $P(z)$ decreases more rapidly according to Equation 5 than to Equation 4, as $z$ increases. This demonstrates another advantage of delay network storage over storage in a single reactance. Some frequency characteristics are given in FIG. 12 calculated from Equations 4 and 5 which show these results. The curves show $P(z)$ expressed in decibels below $P(z)=1$, plotted against values of $z$ from 0 to 0.5. The full line curves U and V correspond to storage in a delay network and the dotted line curves W and X to storage in a single reactance. The values chosen for A and B for these curves are as follows:

U: $A=1.25$ V: $A=3.0$
W: $A=B=1.0$ X: $A=2.0$, $B=1.0$

It will be seen from curves U and W that when the loss for $z=0$ is about 2 decibels in either case, the delay network storage is about 5 decibels better than single reactance storage when $z=0.5$; and from curves V and X, when the initial loss is about 4½ decibels, the delay network storage is about 3 decibels better when $z=0.5$.

Equations 4 and 5 relate to the efficiency of the modem in delivering power to the pulse circuit, but in the case of the present invention it is desirable to know what the overall efficiency for two-way transmission is. This is found to depend on the attenuation and delay of the pulse circuit (29, FIG. 11) connecting the two modem circuits. Since it has been shown that in practice delay network storage is preferable, results for delay network storage only will be given. The efficiency $R(z)$ is defined as the ratio of the power at frequency $f$ delivered to the local circuit 31 (FIG. 11) to that supplied to the local circuit 30, assuming no switching or other losses besides the attenuation of the circuit 29. The efficiency $R(z)$ is given by:

$$\sqrt{R(z)}=2\sqrt{2A}(\cosh A-\cos z)/(A^2+z^2)\sqrt{K} \quad (6)$$

where $K=\cosh 2A-\cos 2z$, for the case in which the terminals are connected directly together, and $$K=\cosh 2(A+L)-\cos 3z$$

for the case in which the two terminals are connected by a circuit having a delay $t_1/2$ and an attenuation L refers.

According to Equation 6 the efficiency $R(z)$ generally decreases as $z$ increases, but in addition the factor K introduces a sort of "wave" on the characteristic curve due to the term $\cos 2z$ or $\cos 3z$. As the delay of the connecting circuit increases, so the period of the "wave" increases. The effect of the "wave" is however damped by the term $\cosh 2(A+L)$ which increases with L and the wave thus tends to become unappreciable as the attenuation increases.

A further reference will now be made to the low pass filter 18 shown in FIG. 5. In the case of conventional pulse demodulators, it is common practice to use a low pass filter for recovering the signal wave from a train of amplitude or duration modulated pulses, but in the case of the modem according to the present invention a filter is not absolutely essential since the duration of the pulses fed to the local circuit at the receiving end is nearly equal to the sampling period $t_1$. However, a suitably designed filter used in each modem is found to produce a small improvement in efficiency. The filter should present a high impedance to the storage circuit at the sampling frequency F, and it has been found that a low-pass constant-K half-section (18, FIG. 5) having a cut-off frequency of 0.4F with the mid series impedance facing the delay network produces satisfactory results. Such a filter produces an improvement in transmitting efficiency as well as in receiving efficiency.

Figure 13:
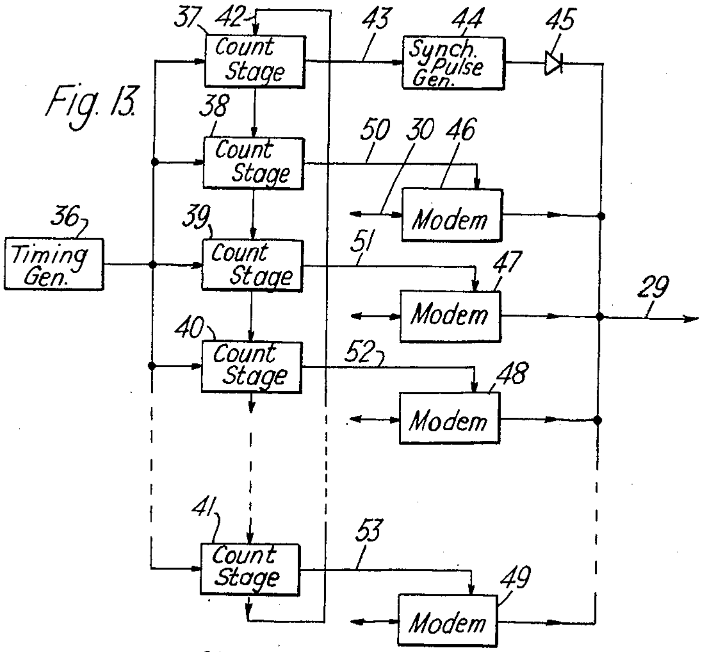
FIGS. 13 and 14 show block schematic circuit diagrams of the two terminal stations of a multi-channel amplitude modulation pulse system employing bilateral pulse modulators according to the invention.
Figure 14:
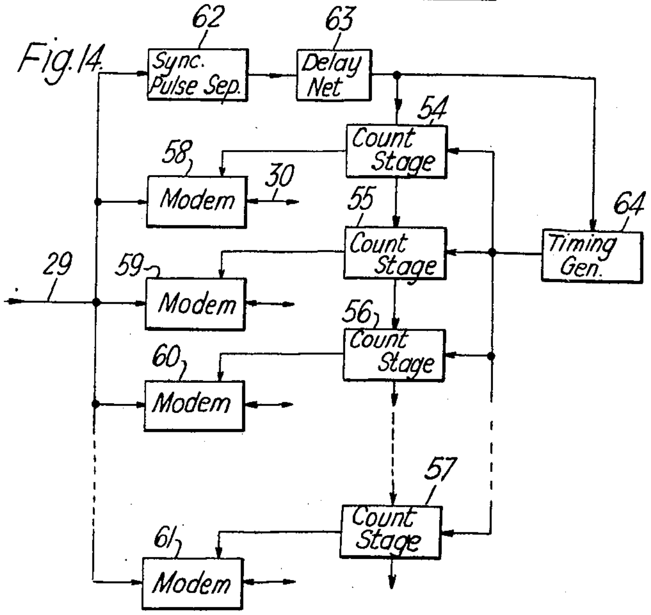

A complete multi-channel amplitude modulation pulse system employing pulse modem circuits according to the invention is shown in the block schematic circuit diagrams of FIGS. 13 and 14, which respectively show the control and the controlled apparatus at the two terminal stations of the system. The control station, FIG. 13, is a slight modification of the arrangement shown in FIG. 1 of the specification accompanying co-pending United States application, Serial No. 448,982, filed August 10, 1954. It will be assumed that the system comprises a total of N channels, namely, one synchronising channel, and $N-1$ communication channels. It will be assumed that the sampling period is $t_1$ and that the duration of the transmitted pulses is $t_2$ which of course must be less than $t_1/N$. A timing generator 36 generates short timing pulses having a frequency $N/t_1$ and supplies them simultaneously to N counting stages, of which only the first four and the $N^{th}$ are shown, and are respectively designated 37 to 41. As explained in the co-pending specification just referred to, the counting stages are of the kind described in the specification of co-pending United States application, Serial No. 441,055, filed July 2, 1954, and are all initially blocked. The operation is started by applying temporarily an initial unblocking potential to one of the counting stages (say 37) by means not shown over an unblocking conductor 42. Stage 37 can then be triggered by the next pulse which arrives from the generator 36 and generates a short pulse which is supplied to an output conductor 43. The stage 37 also generates an unblocking pulse after a delay of $t_1/N$ which is applied to unblock the next counting stage 38 in time for it to be triggered by the next pulse from the generator 36. This process is repeated, each counting stage on being triggered generating an output pulse and unblocking the next counting stage. The $N^{th}$ stage 41 supplies an unblocking pulse over conductor 42 to unblock the first stage 37, and the process continues indefinitely.

The output conductor of the first stage 37 is connected to a synchronising pulse generator 44 which generates a synchronising pulse or signal of some suitable form, distinct from the channel pulses, in response to each switching pulse from the stage 37. The synchronising pulses are supplied to the pulse credit 29 through an isolating rectifier 45, and have a repetition period $t_1$ equal to the sampling period.

$N-1$ modem circuits all similar to FIG. 5 are provided, and are connected respectively to the outputs of the counting stages 2 to N. Only four of these modem circuits are shown, designated 46 to 49, respectively. The switching pulses generated by the counting stage 38 are applied over conductor 50 to the transformer 21 (FIG. 5: not shown in FIG. 13) of the modem 46. The speech or other signal wave to be transmitted is applied to the local line 30, and the amplitude modulated pulses are delivered to the pulse circuit 29.

Switching pulses for the modems 47, 48, 49 are supplied from the corresponding counting stages 39, 40, 41 over conductors 51, 52 and 53 respectively.

It will be seen that at the beginning of each sampling period a synchronising pulse or signal is delivered to the pulse circuit 29 by the generator 44, and is then followed by $N-1$ channel pulses coming from the respective modems.

The controlled station at the other end of the pulse circuit 29 is shown in FIG. 14. It is arranged similarly to FIG. 13, but there are $N-1$ counting stages, of which four are shown designated 54 to 57 which control the $N-1$ modems, of which four are shown designated 58 to 61, which are all connected to the pulse circuit 29, together with a synchronising pulse separator 62 which selects the synchronising pulses or signals which occur at the beginning of each sampling period, and reshapes them to form suitable unblocking pulses for unblocking the counting stage 54 to which they are applied through a delay network 63 having a delay of approximately one channel period, namely $t_1/N$. The pulses from the output of the delay network 63 are applied to control or synchronise a generator 64 which generates timing pulses for operating the counting stages as described with reference to FIG. 13. The repetition frequency of the timing pulses should be $N/t_1$ as before. The timing generator 64 may consist, for example, of a one or more frequency multiplying stages multiplying by a total of N, with means for suitably shaping the resulting timing pulses.

It will be noted that the first counting stage 54 will be unblocked by each synchronising pulse after a delay of $t_1/N$, and it will accordingly apply a switching pulse to the corresponding modem 58 just at the time when the corresponding channel pulse is due to arrive. The remaining counting stages will be unblocked in turn as described with reference to FIG. 13, but it is to be noted that there is in FIG. 14 no unblocking connection between the last counting stage 57 and the first one 54. The unblocking of stage 54 is always done by the synchronising pulse at the beginning of each sampling period.

According to the explanation already given, the pulse circuit 29 must have a delay of $nt_1/2$ where $n$ is zero or an integer. When this condition is fulfilled, it will be clear that two-way transmission on all the $N-1$ communication channels is possible, since the channel arrangements of FIGS. 13 and 14 are identical. The synchronising channel is, however, operated in one direction only, since it is not necessary to synchronise both ways.

It will be noted that the modem circuits in FIGS. 13 and 14 are all connected in parallel to the pulse circuit 29. This will be the normal arrangement when the storage device in the modem is a capacitor or an open-circuited delay line. However, if an inductor or a short-circuited delay line is used, the switching will be arranged as shown in FIG. 2 and the contacts 13 on the pulse circuit side of the storage device 2 will be closed except during the transmission of a pulse. With this arrangement, the modems of a multi-channel system should be connected in series to the pulse circuit. However, the connection of the modems in series is liable to produce crosstalk difficulties which may be impracticable to remove, and so the parallel connection shown in FIGS. 13 and 14 is preferable. This, however, tends to increase the capacity effectively in shunt with the pulse circuit, and this circuit should therefore have a relatively low impedance in order that the pulses shall not be appreciably distorted, whereby crosstalk between neighbouring channels is produced.

In conventional rectifier switching circuits, the circuit impedance should be approximately equal to the geometric mean of the forward and reverse impedance of the rectifiers used in order to obtain the best overall results. In the case of the modem circuit of the present invention the two circuits to be connected by the rectifier switch have different impedances, and their ratio $R_1/R_2$ is of the order of $(t_1-t_2)/t_2$ in the case where storage is by a capacitor or open circuited delay network. In this case the best results are obtained when the geometric mean of the forward and reverse impedances of the rectifiers is approximately equal to $\sqrt{R_1R_2}$. This requirement in practice results in quite small values of $R_2$, so that the crosstalk due to pulse distortion resulting from shunt capacity is easily made negligible. A numerical example will make the advantage clearer. In the case of a 25 channel system employing 1 microsecond pulses and a sampling period of 100 microseconds, and using rectifiers in which the geometric means of the forward and reverse resistances is 5,000 ohms, it will be seen that $R_1/R_2$ is approximately 100 so $R_2=500$ ohms and $R_1=50,000$ ohms. If it be supposed that the shunt capacity introduced by all the modems is 300 microfarads, the pulse circuit impedance being only 500 ohms, the crosstalk between adjacent channels can be shown to be about 190 decibels. If, as in conventional arrangements, the circuit impedances connected by the switch are equal, then $R_1=R_2=5,000$ ohms and the crosstalk is now about 20 decibels, which is impractically high.

Referring again to FIGS. 11, 13 and 14 it was stated that the delay of the pulse circuit 29 must be equal to $nt_1/2$. In some cases, for example in radio systems, the circuit or channel connecting the two stations will actually comprise two separate one-way paths which employ different carrier frequencies. The requirement for synchronising the two ends of the system can then be stated in the following form, namely, that the total time of transmission from one station to the other along one path and back along the other path must be equal to $nt_1$. This means that the transmission times of the two paths need not be equal, and this may simplify the routing of the two paths in order to fulfill the synchronising requirement.

This same consideration leads to the conclusion that the pulse circuit may be arranged in the form of a complete ring or loop round which the pulses circulate in one direction only, and terminal stations with pulse modems for one or more channels may be connected at any points in the loop, provided that the time taken for a pulse to make one circuit of the loop is equal to $nt_1$. The arrangement is shown diagrammatically in FIG. 15. A pulse circuit 65 of any type is formed into a complete loop, which need not be circular as shown. The time taken for one complete journey round the loop should be adjusted to $nt_1$ (if necessary by the addition of a delay network, not shown). Four pulse terminals 66, 67, 68, 69 are shown connected at corresponding points of the loop. The location of these points is unrestricted, and any number of such pulse terminals could be provided. Rectifiers 70, 71, 72 and 73 are shown in the loop circuit 65 associated with the pulse terminals to ensure circulation of the pulses in a clockwise direction only. These rectifiers are intended to represent any suitable means for producing this result, according to the nature of the loop 65, and may not be necessary in some cases.

One of the terminals, 66 for example, will be chosen as the control terminal and its circuit may be as shown in FIG. 13, but will include only those modem circuits corresponding to the channel or channels which are to operate to this station. The other terminals 67, 68 and 69 will be controlled or synchronised by the terminal 66, and their circuits may be as shown in FIG. 14, again including only those modems which correspond to the channel or channels which are to operate at the station concerned. At any station the counting stage corresponding to an omitted modem may be omitted and replaced by a delay network connected in the path of the unblocking pulse from the preceding counting stage, the delay introduced being $t_1/N$ for each omitted counting stage. It will be clear from the explanation given with reference to FIGS. 13 and 14 that the synchronising pulses supplied by the terminal station 66 will correctly determine the time cycle at each of the other stations in such manner as to ensure that any modem circuit is switched when a corresponding incoming pulse is expected.

Figure 15:
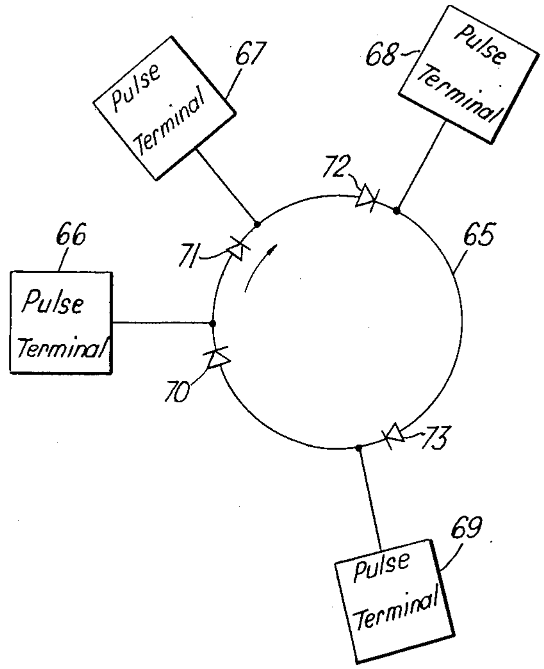
FIG. 15 shows a block schematic circuit diagram of a system of pulse terminals employing bilateral pulse modulators according to the invention, connected to a ring pulse circuit.

The arrangement of FIG. 15 could, for example, be used to connect groups of subscribers over a common ring circuit to an exchange. In that case, terminal 66, for example, could be in the exchange and would be equipped with modems for all channels. The other terminals would then each be equipped for one or more of the individual subscribers.

While the principles of the invention have been described above in connection with specific embodiments, and particular modifications thereof, it is to be clearly understood that this description is made only by way of example and not as a limitation on the scope of the invention.

What I claim is:

1. An electric pulse translating system including a source of amplitude modulated signal waves, a pulse circuit for producing amplitude modulated pulse trains possessing substantially the same information as that contained in the signal waves, the pulses of said train being short with respect to the spacing therebetween, said spacing being substantially fixed and related to the frequency of the signal wave comprising a storage device connected to said signal wave source, having a storage capacity sufficient to store substantially all the energy of said wave applied to it during the interval intermediate successive pulses of said train, high impedance means for applying said energy from said source to said storage means, a low impedance output circuit, switching means intermediate said storage means and said output circuit and means to periodically operate said switching means to produce alternately an open circuit condition between said storage circuit and said output circuit for a period substantially equal to the spacing between said pulses for storing said energy from said signal means and a closed circuit condition between said storage device and said output circuit for a period equal to the duration of said pulses, the periodicity of said operating means being substantially greater than that of the highest frequency of said signal waves.

2. An electric pulse translating system according to claim 1 wherein the switching means comprises a rectifier bridge, one diagonal of the bridge being connected in the circuit between said storage device and said pulse circuit, the other diagonal being connected to said operating means and adjusting means for controlling the time of opening of said switching means comprising a biasing means.

3. An electric pulse translating system according to claim 2 wherein the storage device comprises a delay line.

4. An electric pulse translating system according to claim 3 wherein the resistance of the signal wave circuit is substantially greater than the surge impedance of the delay line.

5. An electric pulse translating system according to claim 4 wherein the signal wave circuit includes a low pass filter.

6. A two-way electric pulse communication system comprising two pulse translating systems, each arrangement according to claim 1, a pulse communication circuit, said arrangements being connected one at either end of said communication circuit, the time delay of said circuit being equal to an integral multiple of half the operating period of the translating arrangements and means for synchronizing the two translating arrangements in such a manner that pulses generated by each translating arrangement arrive at the other translating arrangement during the shorter time intervals.

7. A two-way multi-channel electric pulse communication system comprising two terminal stations connected by a communication circuit, each terminal station comprising a plurality of pulse translating systems, each according to claim 1, the time delay suffered by a pulse traveling over the communication circuit from one terminal station to the other and back again being equal to an integral multiple of the operating period of the said translating arrangements, and means for synchronizing all the said pulse translating arrangements in such manner that pulses generated by each pulse translating arrangement at one terminal station arrive at the corresponding pulse translating arrangement at the other terminal station during the shorter time intervals of operation of the last-mentioned translating arrangement.

8. A multi-channel electric pulse communication system comprising a communication circuit forming a closed loop, a plurality of terminal stations connected to the communication circuit at different points on said loop, each terminal station comprising at least one pulse translating system according to claim 1, the time delay suffered by a pulse making the complete transit of the loop being equal to an integral multiple of the operating period of each translating arrangement, means for causing pulses to circulate round the loop in one direction only, and means for synchronizing all the translating arrangements in such manner that pulses generated by each translating arrangement at one station arrive at the corresponding translating arrangement at another station during the shorter time intervals of operation of the last-mentioned translating arrangement.

References Cited in the file of this patent

UNITED STATES PATENTS

| | | |
|---|---|---|
| 2,429,471 | Lord | Oct. 21, 1947 |
| 2,443,195 | Pensyl | June 15, 1948 |
| 2,474,244 | Grieg | June 28, 1949 |
| 2,535,906 | Dillon | Dec. 26, 1950 |
| 2,546,994 | Fromageot et al. | Apr. 3, 1951 |
| 2,558,018 | Thornton et al. | June 26, 1951 |
| 2,590,746 | Adler | Mar. 25, 1952 |
| 2,644,130 | Summers | June 30, 1953 |
| 2,662,116 | Potier | Dec. 8, 1953 |
| 2,718,621 | Haard et al. | Sept. 20, 1955 |
| 2,743,360 | Stanton et al. | Apr. 24, 1956 |
| 2,837,638 | Frink | June 3, 1958 |
| 2,850,572 | Bacher | Sept. 2, 1958 |